(12) United States Patent
Brown

(10) Patent No.: US 10,010,215 B2
(45) Date of Patent: Jul. 3, 2018

(54) COOKING ASSEMBLY

(71) Applicant: Corey John Murray Brown, Freeport (BS)

(72) Inventor: Corey John Murray Brown, Freeport (BS)

( * ) Notice: Subject to any disclaimer, the term of this patent is extended or adjusted under 35 U.S.C. 154(b) by 1404 days.

(21) Appl. No.: 13/843,665

(22) Filed: Mar. 15, 2013

(65) Prior Publication Data
US 2014/0261013 A1 Sep. 18, 2014

(51) Int. Cl.
*A47J 37/04* (2006.01)
*A47J 37/07* (2006.01)

(52) U.S. Cl.
CPC .............. *A47J 37/04* (2013.01); *A47J 37/041* (2013.01); *A47J 37/0745* (2013.01)

(58) Field of Classification Search
CPC ...... A47J 37/0745; A47J 37/04; A47J 37/041; A47J 37/042; A47J 37/046
USPC .................................. 99/419, 421 H, 421 R
See application file for complete search history.

(56) References Cited

U.S. PATENT DOCUMENTS

| | | | |
|---|---|---|---|
| 2,939,384 A | 6/1960 | Vinson | |
| 3,169,470 A | 2/1965 | Oatley | |
| 3,939,761 A | 2/1976 | Mcginty | |
| 4,154,154 A | 5/1979 | Vivian | |
| 4,176,592 A * | 12/1979 | Doyle, Jr. | A47J 37/0694 99/419 |
| 4,760,776 A | 8/1988 | Beidler | |
| 5,001,971 A | 3/1991 | Beller | |
| 5,172,628 A | 12/1992 | Pillsbury et al. | |
| 5,649,475 A | 7/1997 | Murphy et al. | |
| 5,715,744 A | 2/1998 | Coutant | |
| 5,960,706 A | 10/1999 | Cheng | |
| 6,837,151 B2 | 1/2005 | Chen | |
| 8,079,302 B2 * | 12/2011 | Giangrasso | A47J 27/122 126/275 R |
| 9,038,620 B2 * | 5/2015 | Brown | F23B 20/00 126/25 R |
| 2010/0122630 A1 * | 5/2010 | Nimerovskiy | A47J 37/041 99/421 H |

(Continued)

FOREIGN PATENT DOCUMENTS

WO 2007056871 A1 5/2007

OTHER PUBLICATIONS

International Preliminary Report on Patentability for International Application No. PCTIB2014059124 dated May 6, 2015.

(Continued)

*Primary Examiner* — Dana Ross
*Assistant Examiner* — James Sims, III

(57) ABSTRACT

A cooking assembly is provided. The cooking assembly includes first, second, third, and fourth side walls defining an interior region. The cooking assembly further includes a skewer having a shaft, a handle, and a sprocket. The skewer is configured to be rotatably and removably coupled to the first and second side walls such that a portion of the shaft between the sprocket and the handle is rotatably disposed in a first groove of the first side wall, and the second end of the shaft extends through a first aperture of the second side wall, and the sprocket of the skewer is disposed in the interior region. The cooking assembly further includes a chain drive assembly coupled to the first side wall.

15 Claims, 7 Drawing Sheets

(56) References Cited

U.S. PATENT DOCUMENTS

2013/0125766 A1* 5/2013 George ................ A47J 37/044
99/425

OTHER PUBLICATIONS

Article 19 Amendment filed on Jul. 15, 2014 for International application No. PCT/IB2014/059124.
International Application No. PCT/IB2014/059124 filed on Feb. 20, 2014 entitled Cooking Assembly.
International Search Report for International application No. PCT/IB2014/059124 dated Apr. 28, 2014.
Written Opinion for International application No. PCT/IB2014/059124 dated Apr. 28, 2014.

* cited by examiner

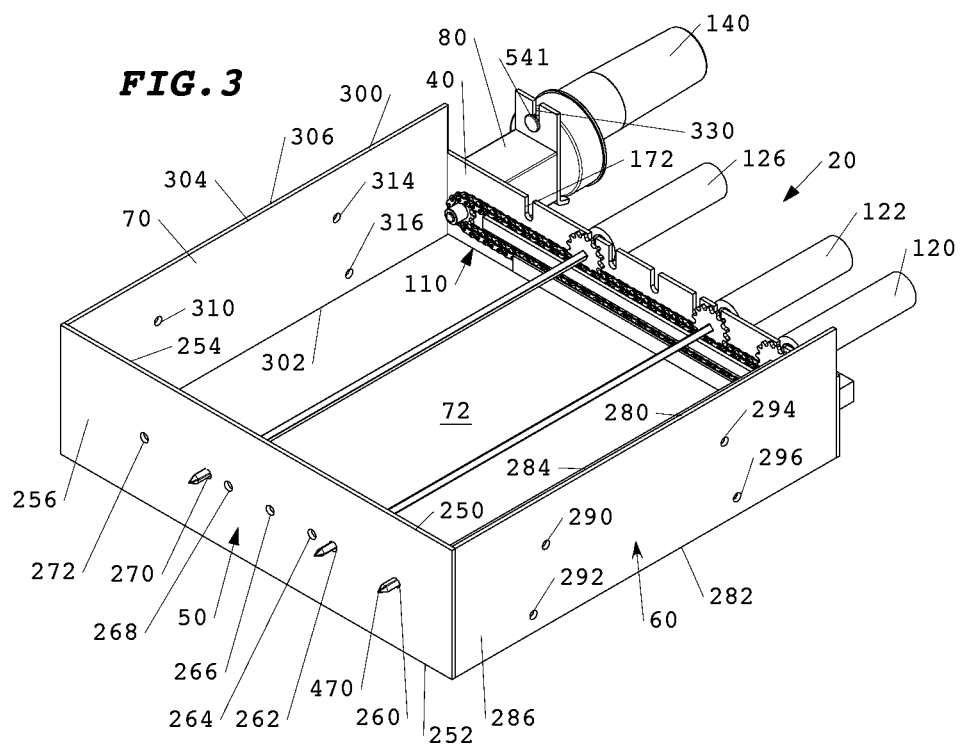
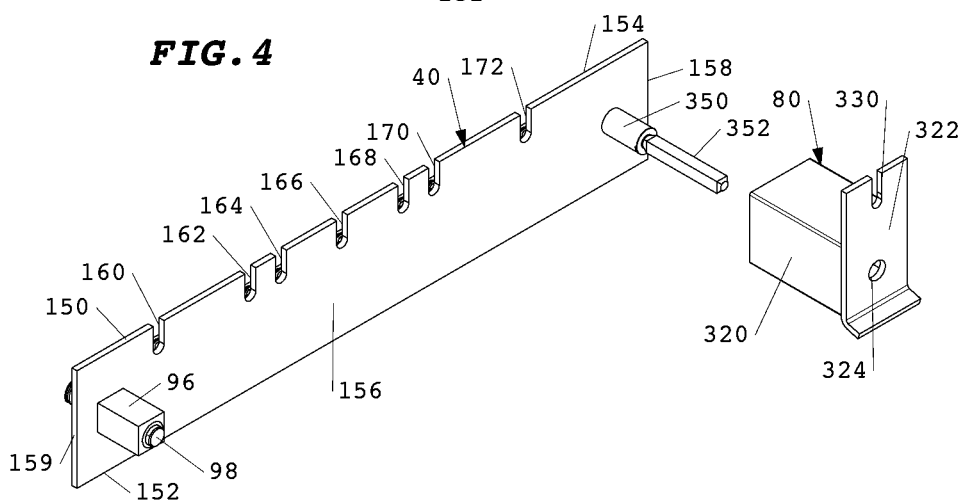

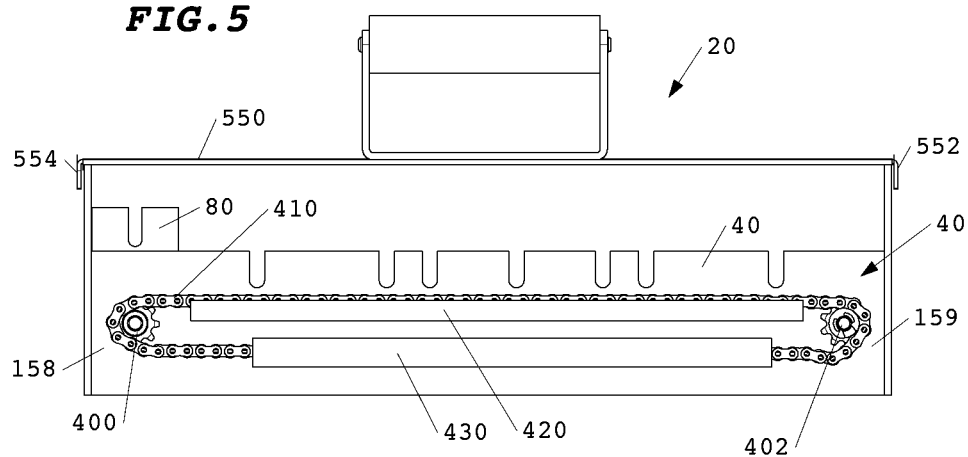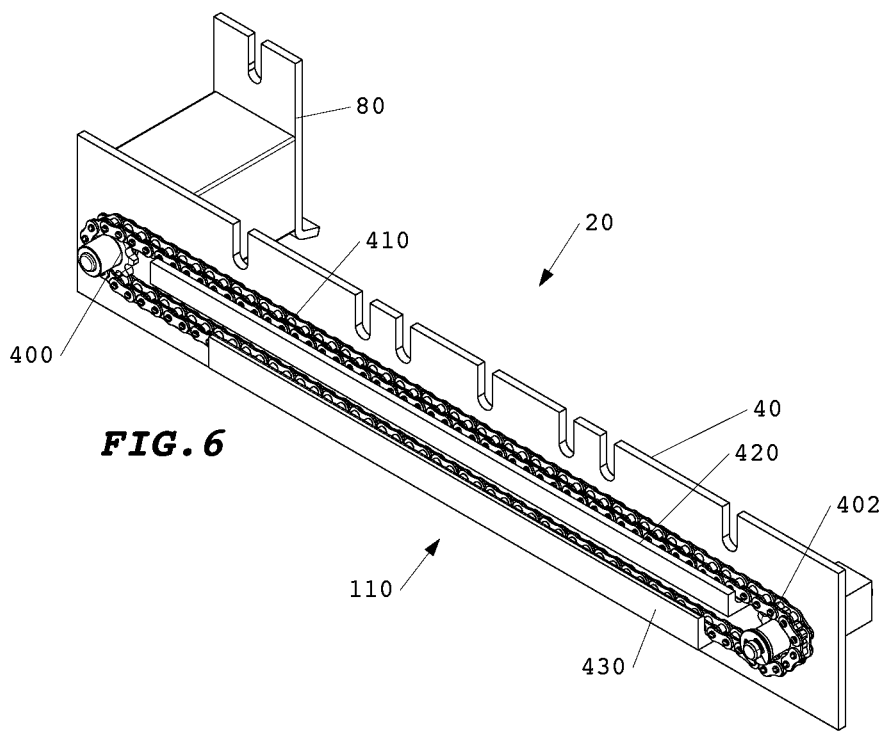

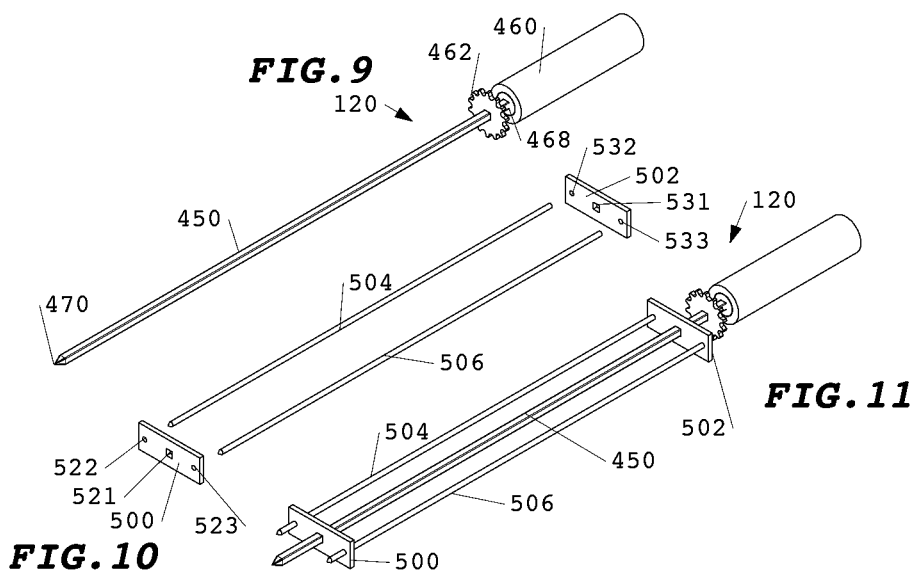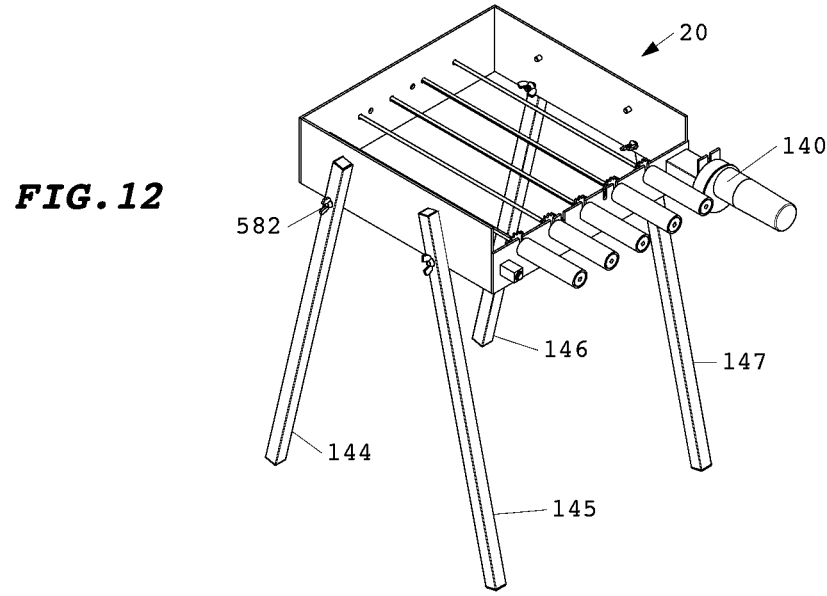

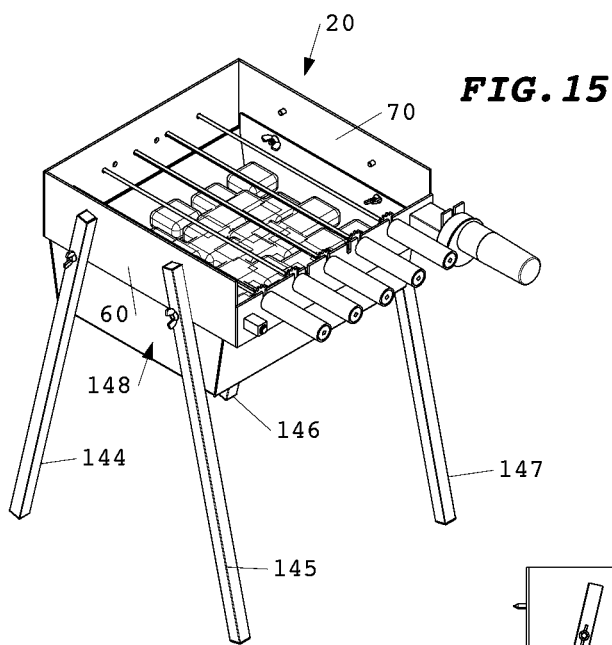
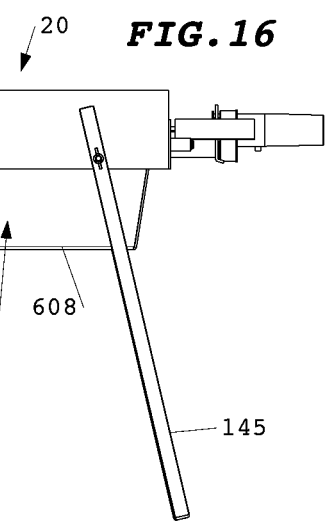
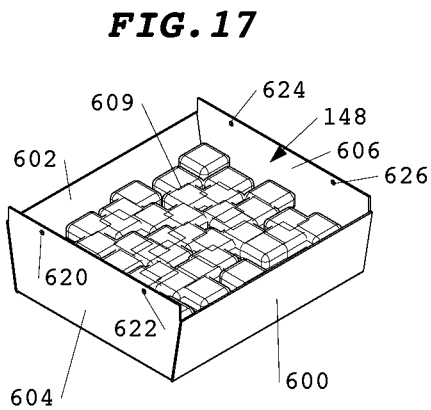

COOKING ASSEMBLY

BACKGROUND

Barbecue rotisseries have been developed for rotating barbeque skewers. One barbecue rotisserie utilizes external moving components which can undesirably contact an operator. Another barbecue rotisserie utilizes internal moving components that are undesirably centrally located in a cooking region.

The inventor herein has recognized a need for an improved cooking assembly that minimizes and/or reduces the above-mentioned deficiencies.

SUMMARY

A cooking assembly in accordance with an exemplary embodiment is provided. The cooking assembly includes first, second, third, and fourth side walls defining an interior region. The first and second side walls are disposed substantially parallel and apart from one another. The third and fourth side walls are disposed substantially parallel and apart from one another. The first side wall is coupled to the third and fourth side walls. The second side wall is coupled to the third and fourth side walls. The first side wall has a first groove therein. The second side wall has a first aperture extending therethrough. The cooking assembly further includes a skewer having a shaft, a handle, and a sprocket. The shaft has a first end and a second end. The sprocket of the skewer is disposed on the shaft a predetermined distance from the first end of the shaft. The handle is coupled to the first end of the shaft. The skewer is configured to be rotatably and removably coupled to the first and second side walls such that a portion of the shaft between the sprocket and the handle is rotatably disposed in the first groove of the first side wall, and the second end of the shaft extends through the first aperture of the second side wall, and the sprocket of the skewer is disposed in the interior region. The cooking assembly further includes a chain drive assembly coupled to the first side wall. The chain drive assembly includes first and second sprockets, a chain, first and second shafts, first and second bearings, and first and second chain support members. The first and second sprockets and the chain are disposed in the interior region. The first and second sprockets are rotatably coupled to the first and second shafts, respectively. The first and second shafts are rotatably supported by the first and second bearings, respectively, which are coupled to the first side wall. The first and second sprockets are configured to move the chain such that the chain rotates the sprocket of the skewer. The first and second chain support members are coupled to the first side wall in the interior region. The first chain support member is disposed between the first and second sprockets and is configured to support a first portion of the chain. The second chain support member is disposed between the first and second sprockets and below the first chain support member. The second chain support member is configured to support a second portion of the chain.

BRIEF DESCRIPTION OF THE DRAWINGS

FIG. 3 is a schematic of the cooking assembly of FIG. 1 with a top cover plate removed therefrom;

FIG. 4 is a schematic of a portion of a front side wall and a motor mounting bracket utilized in the cooking assembly of FIG. 1;

FIG. 5 is a cross-sectional view of the cooking assembly of FIG. 1 illustrating a chain drive assembly utilized therein;

FIG. 6 is another schematic of the chain drive assembly utilized in the cooking assembly of FIG. 1;

FIG. 9 is a schematic of a skewer utilized in the cooking assembly of FIG. 1;

FIG. 10 is a schematic of accessories that can be utilized with the skewer of FIG. 9;

FIG. 11 is a schematic of the skewer of FIG. 9 with the accessories of FIG. 10 disposed thereon;

FIG. 12 is a schematic of the cooking assembly of FIG. 1 with legs attached thereto;

FIG. 15 is a schematic of the cooking assembly of FIG. 12 with a fire box mounted to a bottom portion of the cooking assembly;

FIG. 16 is a side view of the cooking assembly of FIG. 15; and

FIG. 17 is a schematic of the fire box utilized in the cooking assembly of FIG. 15.

DETAILED DESCRIPTION

Figure 1:
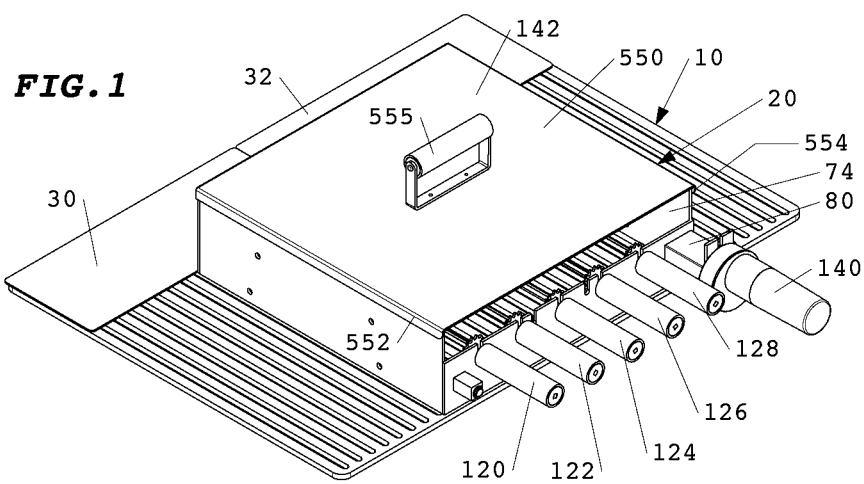
FIG. 1 is a schematic of a grill, and a cooking assembly disposed on the grill in accordance with an exemplary embodiment.

Referring to FIGS. 1, 2, 3 and 15, the cooking assembly 20 for grilling or barbecuing food in accordance with an exemplary embodiment is provided. The cooking assembly includes a front side wall 40, a rear side wall 50, left and right side walls 60, 70, a motor mounting bracket 80, a chain drive assembly 110, skewers 120, 122, 124, 126, 128, an electric motor 140, and a top cover plate 142. Referring to FIG. 15, the cooking assembly 20 can optionally include legs 144, 145, 146, 147, and a fire box 148. An advantage of the cooking assembly 20 is that the assembly 20 utilizes the chain drive assembly 110 that is mounted on the front side wall 40 within an interior region 72 of the cooking assembly 20 which is safer to use than other assemblies. Further, cooking assembly 20 utilizes upper and lower chain support members 420, 430 (shown in FIG. 5) which allow a relatively long chain in the assembly 20 to be driven by only two sprockets.

Figure 2:
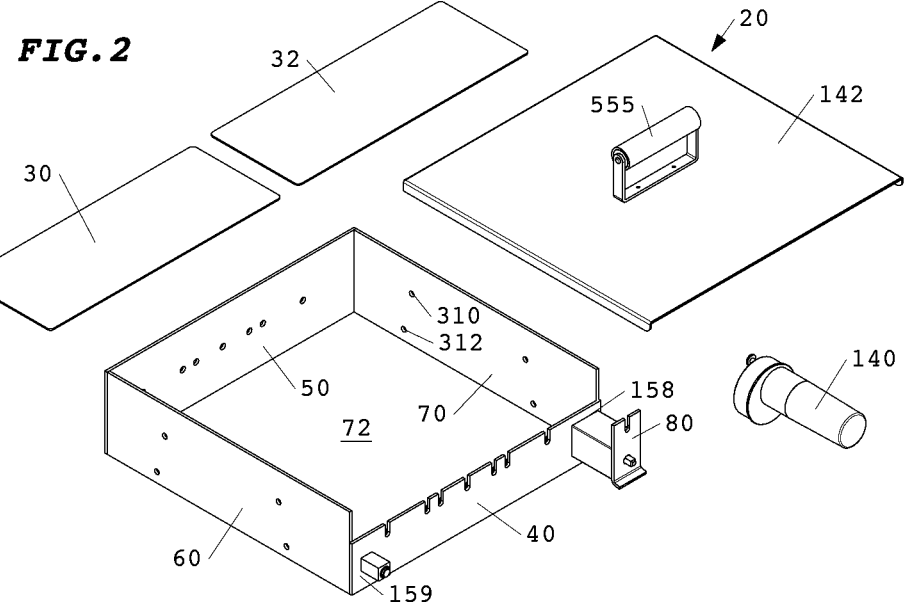
FIG. 2 is an exploded view of the cooking assembly of FIG. 1 in accordance with an exemplary embodiment.

Referring to FIGS. 2-4, the front side wall 40, the rear side wall 50, and the left and right side walls 60, 70 define an interior region 72 therebetween. The front side wall 40 and the rear side wall 50 are disposed substantially parallel and apart from one another. Also, the left and right side walls 60, 70 are disposed substantially parallel and apart from one another. The front side wall 40 is coupled to the left and right side walls 60, 70. Also, the rear side wall 50 is coupled to the left and right side walls 60, 70. In one exemplary embodiment, the front side wall 40, the rear side wall 50, and the left and right side walls 60, 70 are constructed of stainless steel. Of course, in an alternative embodiment, the front side wall 40, the rear side wall 50, and the left and right side walls 60, 70 could be constructed of other materials such as steel, aluminum, or ceramic for example. In the illustrated embodiment, the rear side wall 50 and the left and right side walls 60, 70 each have a substantially equal height to one another. Further, a height of the front side wall 40 is less than respective heights of the rear side wall 50 and the left and right side walls 60, 70 such that a gap 74 (shown in FIG. 1) is desirably formed between the top cover plate 142 and the front side wall 40 which allows a user to view food that is cooking on the skewers 120-128.

Referring to FIGS. 3 and 4, in one exemplary embodiment, the front side wall 40 is a substantially rectangular-shaped plate and includes a top end 150, a bottom end 152, a first side end 158, and a second side end 159. Further, the front side wall 40 has an inner side 154 communicating with the interior region 72 and an outer side 156. Further, the front side wall 40 has grooves 160, 162, 164, 166, 168, 170, 172 extending from the top end 150 into the front side wall 40. The grooves 160-172 are sized to receive shaft portions of the skewers therein. In an alternative embodiment, the front side wall 40 could have another shape depending upon the desired application of the cooking assembly 20.

In an exemplary embodiment, the rear side wall 50 is a substantially rectangular-shaped plate and includes a top end 250 and a bottom end 252. Further, the rear side wall 50 has an inner side 254 communicating with the interior region 72 and an outer side 256. Further, the rear side wall 50 has apertures 260, 262, 264, 266, 268, 270, 272 extending therethrough. The apertures 260-272 are aligned with the grooves 160-172, respectively, in the front side wall 40. Each of the apertures 260-272 is sized to receive a shaft portion of a skewer therethrough. In an alternative embodiment, the rear side wall 50 could have another shape depending upon the desired application of the cooking assembly 20.

In an exemplary embodiment, the left side wall 60 is a substantially rectangular-shaped plate and includes a top end 280 and a bottom end 282. Further, the left side wall 60 has an inner side 284 communicating with the interior region 72 and an outer side 286. Further, the side wall 60 has apertures 290, 292, 294, 296 extending therethrough. In an alternative embodiment, the left side wall 60 could have another shape depending upon the desired application of the cooking assembly 20.

Referring to FIGS. 2 and 3, in one exemplary embodiment, the right side wall 70 is a substantially rectangular-shaped plate and includes a top end 300 and a bottom end 302. Further, the right side wall 70 has an inner side 304 communicating with the interior region 72 and an outer side 306. Further, the right side wall 70 has apertures 310, 312, 314, 316 extending therethrough. In an alternative embodiment, the right side wall 70 could have another shape depending upon the desired application of the cooking assembly 20.

Referring to FIGS. 3 and 4, the motor mounting bracket 80 is configured to be mounted on the outer side 156 of the front side wall 40. The motor mounting bracket 80 includes a frame member 320 and a mounting plate 322. In one exemplary embodiment, the mounting plate 322 and the frame member 320 are constructed of steel. The mounting plate 322 is disposed on a first end of the frame member 320. The mounting plate 322 has a groove 330 extending therein for receiving a motor fastening pin 541 from the motor 140 for removably coupling the motor 140 to the mounting plate 322. The frame member 320 and the mounting plate 322 include an aperture 324 extending therethrough for receiving a portion of the drive shaft 352 therethrough.

Referring to FIGS. 1, 3 and 5-8, the chain drive assembly 110 is configured to rotate the skewers 120-128 and food disposed on the skewers. The chain drive assembly 110 is coupled to the front side wall 40 and includes a drive shaft bearing 350, a drive shaft 352, a secondary shaft bearing 354, a secondary shaft 356, sprockets 400, 402, an endless chain 410, and chain support members 420, 430.

Figure 7:
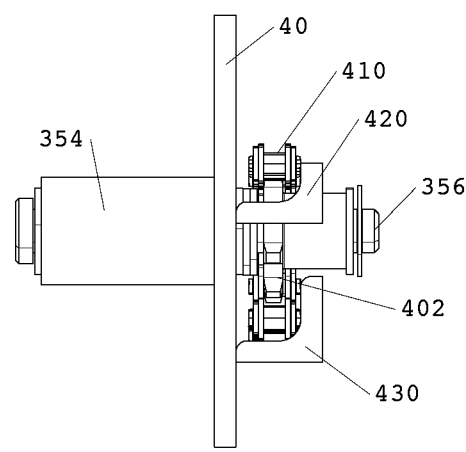
FIG. 7 is a side view of a portion of the chain drive assembly utilized in the cooking assembly of FIG. 1.
Figure 8:
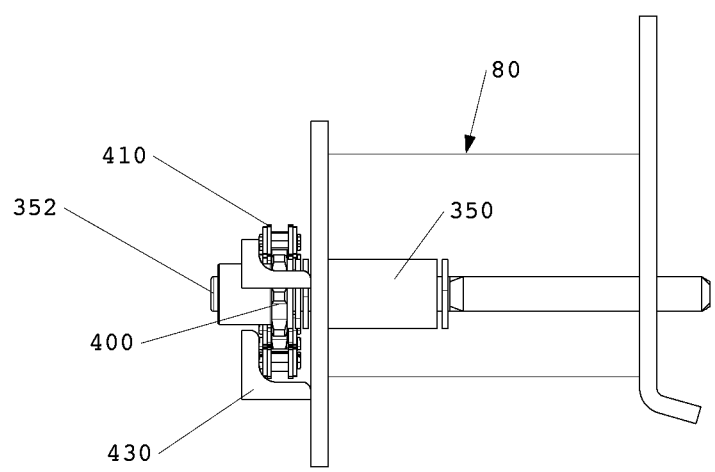
FIG. 8 is another side view of another portion of the chain drive assembly utilized in the cooking assembly of FIG. 1.

Referring to FIGS. 7 and 8, the sprockets 400, 402, the chain 410, and the chain support members 420, 430 are disposed in the interior region 72. The sprocket 400 is rotatably coupled to the drive shaft 352. The drive shaft 352 is rotatably supported by the drive shaft bearing 350 which is coupled to the front side wall 40. Also, the sprocket 402 is rotatably coupled to the secondary shaft 356. The secondary shaft 356 is rotatably supported by the secondary shaft bearing 354 which is coupled to the front side wall 40. Referring to FIG. 5, the sprocket 400 is disposed proximate to a first side end 158 of the front side wall 40, and the sprocket 402 is disposed proximate to a second side end 159 of the front side wall 40. Thus, an advantage of the design of the cooking assembly 20 is that the assembly only utilizes two sprockets to drive the skewers 120-128. During operation, the drive shaft 352 rotates the sprocket 400 which moves the chain 410 and the sprocket 402 such that the chain 410 rotates the sprockets of the skewers 120-128.

Referring to FIGS. 5-8, chain support members 420, 430 are coupled to the front side wall 40 in the interior region 72. In one exemplary embodiment, the chain support members 420, 430 have an identical cross-sectional profile. In particular, in one exemplary embodiment, each of the chain support members 420, 430 have an L-shaped cross-sectional profile.

The chain support member 420 is disposed between the sprockets 400, 402 and is configured to support a first portion of the chain 410. The chain support member 420 extends at least along 80% of a longitudinal length of the front side wall 40. An advantage of the length of the chain support member 420 is that only two sprockets 400, 402 are needed to drive the chain 410 without any intermediate sprockets or chain tensioning devices.

The chain support member 430 is disposed between sprockets 400, 402 and below the chain support member 420 and is configured to support a second portion of the chain 410. An advantage of the chain support member 430 is that the member 430 supports the chain 410 such that the chain 410 does not contact a grill surface.

Referring to FIGS. 1, 3 and 4, the skewers 120-128 are removably and rotatably coupled to the front side wall 40 and the rear side wall 50, utilizing the grooves 160-172 in the front side wall 40, and the apertures 260-272 in the rear side wall 50. Since the structure of the skewers 120-128 are identical to one another, only the structure of the skewer 120 will be described in detail for purposes of simplicity.

Referring to FIGS. 3, 4 and 9, the skewer 120 is configured to hold food (not shown) thereon. The skewer 120 includes a shaft 450, a handle 460, and a sprocket 462. The shaft 450 has a first end 468 and a second end 470. The sprocket 462 of the skewer 120 is disposed on the shaft 450 a predetermined distance from the first end 468 of the shaft 450. The handle 460 is coupled to the first end 468 of the shaft 450. The skewer 120 is configured to be rotatably and removably coupled to the front side wall 40 in the rear side wall 50 such that a portion of the shaft 450 between the sprocket 462 and the handle 460 is rotatably disposed in the groove 160 of the front side wall 40, and the second end 470 of the shaft 450 extends through the aperture 260 (shown in FIG. 3) of the rear side wall 50, and the sprocket 462 of the skewer 120 is disposed in the interior region 72. During placement of the skewer 120 in the groove 160 and the aperture 260, the teeth of the sprocket 462 of the skewer 120 are operationally and removably coupled to the chain 410 such that movement of the chain 410 in a first direction rotates the skewer 120 in a first rotational direction, and movement of the chain 410 in a second direction rotates the skewer 120 in a second rotational direction. In one exemplary embodiment, a ratio of a number of teeth of the sprocket 462 of the skewer 120 and a number of teeth of the drive sprocket 400 is greater than 1.25. For example, in one exemplary embodiment, the sprocket 462 has 14 teeth and the sprocket 400 has 9 teeth. Of course, in alternative embodiments, the sprockets 462 and 400 could have varying numbers of teeth depending on the desired rotational speed of the skewers 120-128.

Referring to FIGS. 10 and 11, the skewer 120 has optional accessories including the plates 500, 502 and the tines 504, 506. The plates 500, 502 are removably coupled to the shaft 450. The tines 504, 506 can be utilized to pierce relatively large pieces of food which are coupled to the skewer 120. The plate 500 includes apertures 521, 522, 523 extending therethrough. The plate 502 includes apertures 531, 532, 533 extending therethrough. The apertures 521, 531 are sized and shaped to receive the shaft 450 therethrough such that the plates 500, 502 to rotate with the shaft 450. The tine 504 extends through the apertures 522, 532 such that the plates 500, 502 support the tine 504 thereon. The tine 506 extends through the apertures 523, 533 such that the plates 500, 502 support the tine 506 thereon. In one exemplary embodiment, the shaft 450 has a rectangular cross-sectional profile and the apertures 521, 531 have a corresponding rectangular cross-sectional profile.

Referring to FIGS. 3, 4 and 8, the electric motor 140 is configured to be removably coupled to the motor mounting bracket 80. In particular, the electric motor 140 includes a pin 541 that is configured to be received within the groove 330 of the motor mounting bracket 80. The electric motor 140 is further configured to rotate the drive shaft 352 for rotating sprockets 400, 402 and moving the chain 410. In one exemplary embodiment, the electric motor 140 is battery powered. In an alternative embodiment, the electric motor 140 is powered via an electrical cord (not shown).

Referring to FIGS. 1 and 2, the top cover plate 142 is configured to be slidably disposed on the left side wall 60 and the right side wall 70. The top cover plate 142 includes a plate portion 550, flange portions 552, 554, and a handle member 555. The flange portions 552, 554 are disposed on opposite ends of the plate portion 550. The plate portion 550 is configured to be disposed on at least on the left side wall 60 and the right side wall 70, and the flange portions 552, 554 are disposed proximate to outer sides of the left side wall 60 and the right side wall 70, respectively. The handle member 555 is coupled to the plate portion 550 is configured to allow an operator to easily position the top cover plate 142 at desired locations.

The heat directing plates 30, 32 can be positioned on the grill 10 to direct heat from the grill 10 into the interior region of the cooking assembly 20.

Figure 13:
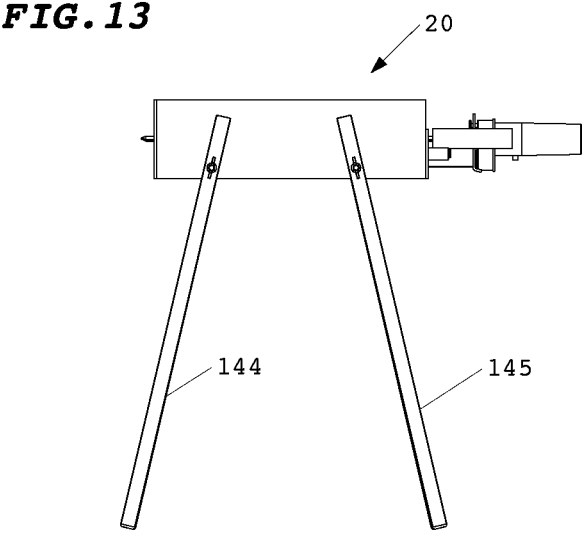
FIG. 13 is a side view of the cooking assembly of FIG. 12.
Figure 14:
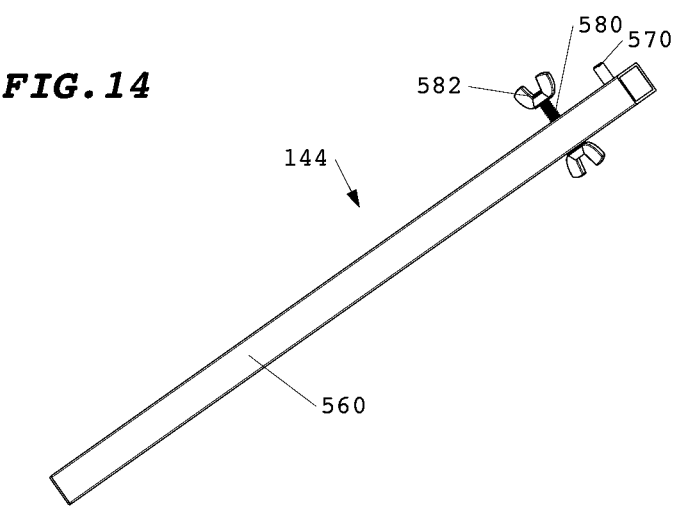
FIG. 14 is a schematic of the leg utilized in the cooking assembly of FIG. 12.

Referring to FIGS. 12-14, the cooking assembly 20 optionally includes the legs 144, 145, 146, 147 for supporting the remainder of the cooking assembly 20 at a desired height. The legs 144, 145 are coupled to the left side wall 60. The legs 146, 147 are coupled to the right side wall 70. Since the structure of the legs 144-147 are identical to one another only the structure of the leg 144 will be described in further detail below for purposes of simplicity.

Referring to FIGS. 12-14, the leg 144 has a tubular shaft 560, a positioning pin 570, a bolt 580, and a nut 582. The tubular shaft 560 has an aperture extending therethrough. The positioning pin 570 is coupled to an exterior surface of the tubular shaft 560 and is configured to be received in the aperture 290 (shown in FIG. 3) of the left side wall 60. The bolt 580 is configured to be received through the aperture of the tubular shaft 560 and the aperture 292 (shown in FIG. 3) in the left side wall 60 to couple the leg 144 to the left side wall 60.

Referring to FIGS. 2 and 15-17, the cooking assembly 20 can further include a fire box 148 that is coupled to the left side wall 60 and the right side wall 70. The fire box 148 is configured to hold charcoal or other flammable materials therein. The fire box 148 includes side walls 600, 602, 604, 606 and a bottom wall 608 which form an interior region 609 for holding the charcoal or other flammable materials therein.

The side wall 604 includes apertures 620, 622 extending therethrough for receiving respective bolts therethrough for coupling the side wall 604 to the left side wall 60. The bolts that are utilized to couple the legs 144, 145 to the left side wall 60 are also utilized to couple the side wall 604 of the fire box 148 to the left side wall 60.

The side wall 606 includes apertures 624, 626 extending therethrough for receiving respective bolts therethrough for coupling the side wall 606 to the right side wall 70. The bolts that are utilized to couple the legs 146, 147 to the right side wall 70 are also utilized to couple the side wall 606 of the fire box 148 to the right side wall 70.

The cooking assembly disclosed herein provides a substantial advantage over other cooking assemblies. In particular, the cooking assembly provides a technical effect of utilizing a compact chain drive assembly that is mounted on a front side wall within an interior region of the assembly and thus is safer to use than other assemblies. Further, the cooking assembly utilizes upper and lower chain support members which allow a relatively long chain in an interior region of the cooking assembly to be driven only by two sprockets.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cooking assembly, comprising:
first, second, third, and fourth side walls having first, second, third, and fourth inner side surfaces, respectively, and first, second, third, and fourth outer side surfaces, respectively; the first, second, third, and fourth outer side surfaces being disposed opposite to the first, second, third, and fourth inner side surfaces, respectively; the first, second, third, and fourth inner side surfaces defining and directly communicating with an interior region therebetween, the first inner side surface facing the second inner side surface, the interior region being sized to hold food therein, the first and second side walls being disposed substantially parallel and apart from one another, the third and fourth side walls being disposed substantially parallel and apart from one another, the first side wall being coupled to the third and fourth side walls, the second side wall being coupled to the third and fourth side walls, the first side wall having a first groove therein, and the second side wall having a first aperture extending therethrough, the second, third, and fourth side walls each having a substantially equal height to one another, and a height of the first side wall being less than respective heights of the second, third, and fourth side walls;

a skewer having a shaft, a handle, and a sprocket; the shaft having a first end and a second end, the sprocket of the skewer being disposed on the shaft a predetermined distance from the first end of the shaft, the handle being coupled to the first end of the shaft; the skewer being rotatably and removably coupled to the first and second side walls such that a portion of the shaft between the sprocket and the handle is rotatably disposed in the first groove of the first side wall, and the second end of the shaft extends through the first aperture of the second side wall, and the sprocket of the skewer is disposed in the interior region that is sized to hold the food therein and is further disposed between the first, second, third, and fourth inner side surfaces of the first, second, third, and fourth side walls, respectively;

a chain drive assembly coupled to the first side wall, the chain drive assembly having first and second sprockets, a chain, first and second shafts, and first and second L-shaped chain support members; the first and second sprockets and the chain being disposed in the interior region between the first, second, third, and fourth inner side surfaces; the first and second sprockets being rotatably coupled to the first and second shafts, respectively; the first and second shafts being supported by the first side wall, the first and second sprockets contacting and moving the chain such that the chain rotates the sprocket of the skewer, the first and second L-shaped chain support members being coupled to the first side wall and extending outwardly from the first inner side surface into the interior region and toward the second inner side surface, the first L-shaped chain support member being disposed between the first and second sprockets supporting a first portion of the chain, the second L-shaped chain support member being disposed between the first and second sprockets and below the first L-shaped chain support member, the second L-shaped chain support member supporting a second portion of the chain; and a motor mounting bracket and a motor, the motor mounting bracket having a frame member and a mounting plate coupled to a first end of the frame member, the frame member having a second end coupled to the first side wall.

2. The cooking assembly of claim 1, wherein the mounting plate having a groove extending therein, the motor having a motor coupling pin configured to be removably received within the groove to removably attach the motor to the mounting plate.

3. The cooking assembly of claim 2, wherein the motor is further coupled to the first shaft that extends through an aperture in the first side wall and an aperture in the mounting bracket, the motor being further configured to rotate the first shaft.

4. The cooking assembly of claim 1, further comprising a fire box coupled to at least the third and fourth side walls and extending below the first, second, third, and fourth side walls.

5. The cooking assembly of claim 1, wherein the skewer further includes first and second plates and a tine, the first plate having first and second apertures extending therethrough, the second plate having third and fourth apertures extending therethrough, the shaft being removably disposed in the first and third apertures, the tine being removably disposed in the second and fourth apertures.

6. The cooking assembly of claim 1, further comprising a first leg coupled to the third side wall, the first leg having a tubular shaft, a positioning pin, and a bolt; the tubular shaft having an aperture extending therethrough, the positioning pin being coupled to an exterior surface of the tubular shaft and is configured to be received in an aperture of the third side wall, the bolt configured to be received through the aperture of the tubular shaft and the aperture in the third side wall to couple the first leg to the third side wall.

7. The cooking assembly of claim 1, wherein the chain drive assembly is only coupled to the first side wall and is not coupled to the second, third, fourth side walls.

8. The cooking assembly of claim 1, further comprising a heat directing plate configured to be disposed on a surface of a grill proximate to at least one of the second, third, and fourth side walls to direct heat into the interior region.

9. The cooking assembly of claim 1, wherein a ratio of a number of teeth of the sprocket of the skewer and a number of teeth of the first sprocket is greater than 1.25.

10. The cooking assembly of claim 1, wherein the first L-shaped chain support member has first and second portions, the first portion extending substantially perpendicular to the first side wall and having a first end that is coupled to the first side wall, the second portion being coupled to a second end of the first portion and extending substantially perpendicular to the first portion.

11. The cooking assembly of claim 1, wherein a length of the first L-shaped chain support member is at least 80% of a horizontal length of the front side wall.

12. The cooking assembly of claim 1, further comprising a top cover plate being slidably disposed on the third and fourth side walls such that a gap is formed between the top cover plate and the first side wall.

13. A cooking assembly, comprising:
first, second, third, and fourth side walls; the first and second side walls having first and second inner side surfaces, respectively, and first and second outer side surfaces, respectively; the first and second outer side surfaces being disposed opposite to the first and second inner side surfaces, respectively; the first and second inner side surfaces at least partially defining and directly communicating with an interior region therebetween, the first inner side surface facing the second inner side surface, the interior region being sized to hold food therein, the first and second side walls being disposed substantially parallel and apart from one another, the third and fourth side walls being disposed substantially parallel and apart from one another, the first side wall being coupled to the third and fourth side walls, the second side wall being coupled to the third and fourth side walls, the first side wall having a first groove therein, and the second side wall having a first aperture extending therethrough, the second, third, and fourth side walls each having a substantially equal height to one another, and a height of the first side wall being less than respective heights of the second, third, and fourth side walls;

a skewer having a shaft, a handle, and a sprocket; the shaft having a first end and a second end, the sprocket of the skewer being disposed on the shaft a predetermined distance from the first end of the shaft, the handle being coupled to the first end of the shaft; the skewer being rotatably and removably coupled to the first and second side walls such that a portion of the shaft between the sprocket and the handle is rotatably disposed in the first groove of the first side wall, and the second end of the shaft extends through the first aperture of the second side wall, and the sprocket of the skewer is disposed in the interior region that is sized to hold the food therein and is further disposed between the first and second inner side surfaces of the first and second side walls, respectively; and a chain drive assembly coupled to the first side wall, the chain drive assembly having first and second sprockets, a chain, first and second shafts, and a first L-shaped chain support member; the first and second sprockets and the chain being disposed in the interior region between the first and second inner side surfaces; the first and second sprockets being rotatably coupled to the first and second shafts, respectively; the first and second shafts being supported by the first side wall, the first and second sprockets contacting and moving the chain such that the chain rotates the sprocket of the skewer, the first L-shaped chain support member being coupled to the first side wall and extending outwardly from the first inner side surface into the interior region toward the second inner side surface, the first L-shaped chain support member being disposed between the first and second sprockets supporting a first portion of the chain; and a motor mounting bracket and a motor, the motor mounting bracket having a frame member and a mounting plate coupled to a first end of the frame member, the frame member having a second end coupled to the first side wall.

14. The cooking assembly of claim 13, further comprising a top cover plate being slidably disposed on the third and fourth side walls such that a gap is formed between the top cover plate and the first side wall.

15. The cooking assembly of claim 13, wherein the chain drive assembly further includes a second L-shaped chain support member, the second L-shaped chain support member being coupled to the first side wall and extending outwardly from the first inner side surface into the interior region toward the second inner side surface, the second L-shaped chain support member being disposed between the first and second sprockets and below the first L-shaped chain support member, the second L-shaped chain support member supporting a second portion of the chain.

* * * * *